US 6,654,430 B1

(12) United States Patent
Kim et al.

(10) Patent No.: US 6,654,430 B1
(45) Date of Patent: Nov. 25, 2003

(54) APPARATUS FOR RECEIVING DIGITAL SUBSCRIBER LINE SIGNAL HAVING RESILIENCE TO HAM RADIO INTERFERENCE AND METHOD THEREFOR

(75) Inventors: Eung-sun Kim, Yongin (KR); Myeon-kyun Cho, Yongin (KR); Ki-ho Kim, Yongin (KR); Chong-dae Yim, Seoul (KR); Kyu-min Kang, Pusan (KR); Gi-hong Im, Pohang (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/417,687

(22) Filed: Oct. 13, 1999

(30) Foreign Application Priority Data

Oct. 14, 1998 (KR) .............................. 98-42929

(51) Int. Cl.[7] ................................ H03D 1/04
(52) U.S. Cl. ................... 375/346; 375/222; 375/231
(58) Field of Search ................... 375/221, 222, 375/229–231, 316–318, 326, 345, 346, 348

(56) References Cited

U.S. PATENT DOCUMENTS

| 5,703,905 A | * | 12/1997 | Langberg | 375/232 |
| 5,872,540 A | * | 2/1999 | Casabona et al. | 342/362 |
| 5,903,608 A | * | 5/1999 | Chun | 375/260 |
| 6,289,044 B1 | * | 9/2001 | Velez et al. | 375/222 |
| 6,320,867 B1 | * | 11/2001 | Bellenger et al. | 370/420 |
| 6,327,311 B1 | * | 12/2001 | Ojard | 375/261 |
| 6,332,009 B2 | * | 12/2001 | Olafsson | 375/358 |
| 6,389,062 B1 | * | 5/2002 | Wu | 375/222 |
| 6,445,733 B1 | * | 9/2002 | Zuranski et al. | 375/231 |
| 6,459,727 B1 | * | 10/2002 | Cho et al. | 375/222 |
| 6,522,699 B1 | * | 2/2003 | Anderson et al. | 375/295 |

* cited by examiner

Primary Examiner—Hassan Kizou
Assistant Examiner—Andrew M Waxman
(74) Attorney, Agent, or Firm—Lee & Sterba, P.C.

(57) ABSTRACT

A digital subscriber line receiving apparatus having resilience to HAM radio interference noise and a method therefore includes an automatic gain controller for amplifying a received signal level to a signal level having a predetermined magnitude, a timing recoverer for recovering timing from a signal output from the automatic gain controller, an equalizer for removing interference noise from a signal received from the timing recoverer, a slicer for detecting a digital value from a signal received from the equalizer, an initialization controller for resetting the receiving apparatus and initializing the automatic gain controller, the timing recoverer, and the equalizer when the signal to noise ratio of the output signal of the equalizer is smaller than a reference signal to noise ratio, and an update controller for preventing automatic gain controller and equalizer from being initialized by the initialization controller when HAM radio interference noise is detected in the received signal.

10 Claims, 4 Drawing Sheets

APPARATUS FOR RECEIVING DIGITAL SUBSCRIBER LINE SIGNAL HAVING RESILIENCE TO HAM RADIO INTERFERENCE AND METHOD THEREFOR

BACKGROUND OF THE INVENTION

1. Field of the Invention

The present invention relates to a digital subscriber system, and more particularly, to a digital subscriber line signal receiving apparatus unsusceptible to HAM radio interference.

2. Description of the Related Art

Demand for wideband multimedia services is increasing due to the popularity growth of video on demand (VOD), interactive video, teleconferencing, browsing the internet, and downloading large audio and video files from the internet. Optimally, wideband multimedia services are supplied to the subscriber via wideband techniques, so data will flow through the network to the subscriber without delay. Asynchronous transfer mode (ATM) networks typically carry this type of traffic, so an optical cable must be installed from the ATM network to the subscriber's home to prevent a data flow bottleneck leaving the ATM network. However, optical cable installation is considerably expensive and time consuming. A less costly and more quickly installed alternative is digital subscriber line (DSL or XDSL) since it can utilize an existing local loop within a telephone network. xDSL more specifically refers to high-bit-rate DSL (HDSL), asymmetric DSL (ADSL), very-high-bit-rate DSL (VDSL), etc. A typical high speed DSL end to end connection has a local loop connected to the connection originator and a local loop connected to the connection destination. An optical network such as ATM can connect the two local loops. DSL technology mixes high speed data with general telephone service over an existing telephone line to the subscriber. Typically, multimedia applications need high bandwidth going from the data source to the subscriber. For example, a VOD session would stream compressed video data (a huge amount of data) from an information source to the subscriber and control data (e.g. video selection) from the subscriber to the information source.

VOD service is an asymmetrical service because the download channel from a video server to a subscriber has much larger bandwidth than the upload channel from the subscriber to the video server. An asymmetric digital subscriber line (ADSL) is used with respect to the asymmetrical service. ADSL technology uses a local loop to connect the subscriber to a central office (CO) or an optical network unit (ONU). As the traffic speed or bandwidth increase the local loop distance must decrease. However, a repeater may be placed in the local loop to increase the minimum distance from the CO or ONU to the subscriber. The local loop uses an existing copper wire subscriber line, so equipment and service installation are as simple as for conventional telephone service.

Various signals are simultaneously transmitted using a pair of telephone lines without overlapping frequency bands by locating video and control signal bands above the frequency band used by a conventional telephone signal.

The most severe obstacle in DSL is radio frequency interference (RFI) signals due to HAM radio. The RFI is mainly generated in a portion of the network in which a drop cable for distributing a signal is connected to a lower cable.

FIG. 1 illustrates the transmission setup of a general digital subscriber line. A transmitting end 11 of a digital subscriber line transmits data from an information source in the direction of a subscriber. A data signal transmitted by the transmitting end 11 passes through a communication channel 12 including a transmission line. The transmission line is copper, so interference noise 13 and an RFI signal 14 such as narrowband noise or white Gaussian noise are added to the signal resulting in a signal received by a receiving end 15.

FIG. 2 shows the receiving end 15 of FIG. 1 in detail. When a receiving end system is turned on, an initialization controller 28 sequentially initializes an automatic gain controller (AGC) 20, timing recoverer 22, and an equalizer 24 respectivelly. The AGC 20 amplifies the received, signal to a predetermined signal size. The timing recoverer 22 searches the signal output by the AGC 20 for correct timing information thereby generating a synchronized signal. The equalizer 24 removes noise from the synchronized signal and outputs the resulting signal. A slicer 25 compares the level of the signal output from the equalizer 24 to a predetermined level to convert the received signal to a digital signal. Additionally, a signal to noise ratio (SNR) sensor 30 compares the signal output by the equalizer 24 to a predetermined SNR value and informs the initialization controller of the result.

When a HAM radio signal is applied to the signal received by the receiving apparatus shown in FIG. 2 or the HAM radio signal is applied and then disappears, the equalizer 24 of the receiving end outputs an erroneous signal which suddenly increases. Hence, a reduction in the signal to noise ratio (SNR) of the output signal of the receiving apparatus. The SNR sensor 30 informs the initialization controller 28 of the change in SNR, so the initialization controller 28 re-initializes the AGC 20, the timing recoverer 22, and the equalizer 24.

The digital subscriber line receiving apparatus according to the conventional technology repeats such an initialization process whenever the HAM radio signal is applied or the HAM radio signal is applied and disappears. Accordingly, data is lost during the transmission and reception of data. Therefore, smooth transmission and reception of data cannot be performed.

SUMMARY OF THE INVENTION

The present invention overcomes the problems of the conventional technology by being resilient to HAM radio interference. It is an feature of the present invention to provide an apparatus for receiving a digital subscriber line signal which is free from HAM radio interference noise for preventing data from being lost due to the characteristic of a HAM radio signal included in a signal received by a digital subscriber receiving apparatus.

It is another feature of the present invention to provide a method for receiving the digital subscriber line signal.

Accordingly, to achieve the first objective, there is provided a digital subscriber line receiving end apparatus resilient to HAM radio interference noise, for receiving a signal from an information source through a communication channel, comprising:

an automatic gain controller for amplifying a received signal to a predetermined magnitude;

a timing recoverer for recovering timing from a signal output from the automatic gain controller;

an equalizer for removing interference noise from a signal output by the timing recoverer;

an initialization controller for resetting and initializing the automatic gain controller, the timing recoverer, and the equalizer; and an update controller for comparing signal to noise ratio of a signal output by the equalizer to a reference signal to noise ratio, and freezing a re-initialization state of the automatic gain controller and the equalizer for a predetermined length of time when the signal to noise ratio of the signal from said equalizer is greater than the reference signal to noise ratio and HAM radio interference noise is detected in the signal from said equalizer.

To achieve the second feature, there is provided a method for recovering a signal having HAM radio interference noise in a digital subscriber line receiving end apparatus, comprising the steps of (a)initializing a automatic gain controller, a timing recoverer, and a equalizer for a predetermined period of time, (b) determining the existence of HAM radio interference noise by comparing a signal to noise ratio of an output signal from the equalizer to a reference signal to noise ratio, (c) continuing step (b) after initializing the automatic gain controller, the timing recoverer, and the equalizer again when HAM radio interference noise is not detected in step (b), and (d)continuing step (b) after initializing the automatic gain controller, the timing recoverer, and the equalizer again and freezing the automatic gain controller and the equalizer for a predetermined time, when the HAM radio interference noise is detected in step (b).

BRIEF DESCRIPTION OF THE DRAWINGS

The above features and advantages of the present invention will become more apparent by describing in detail a preferred embodiment thereof with reference to the attached drawings in which.

DESCRIPTION OF THE PREFERRED EMBODIMENTS

Korean application no. 98-42929, filed Oct. 14,1998, is incorporated by reference as is fully set for herein.

Figure 3:
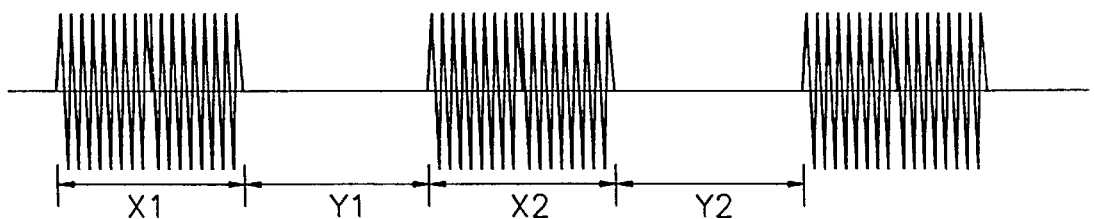
FIG. 3 demonstrates the on/off characteristic of a HAM radio signal.

Hereinafter, the present invention will be described in detail with reference to the attached drawings. As shown in FIG. 3, a HAM radio signal has a periodic on/off characteristic. For example, the HAM radio signal shows periods of X1 and X2 each of about 10 seconds in which the HAM radio signal is in an on, state and periods of Y1 and Y2 each of about 5 seconds in which the HAM radio signal is in an 'off' state.

In the present invention, the digital subscriber receiving end apparatus 15 effectively removes HAM radio signal interference from a received signal which incorporates the periodic on/off characteristic of the HAM radio signal.

Figure 4:
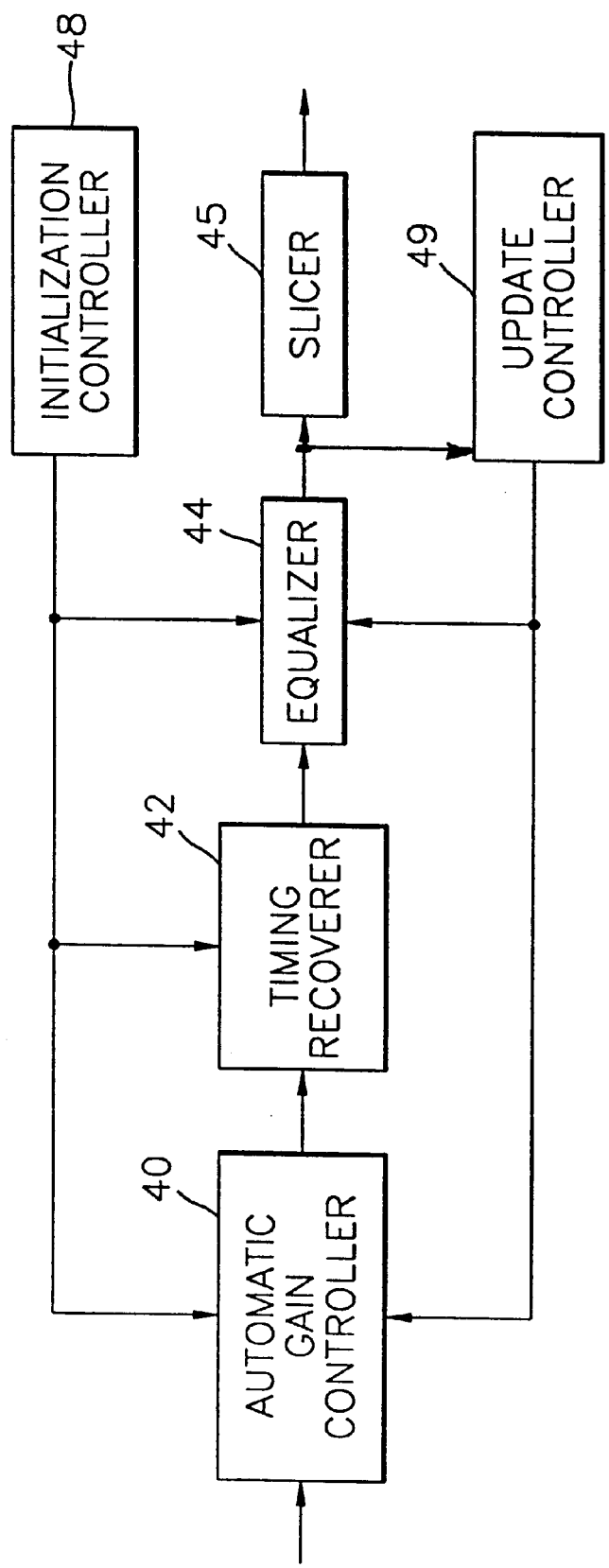
FIG. 4 is a block diagram showing an embodiment of a digital subscriber line receiving end apparatus according to the present invention.

Referring to FIG. 4, an embodiment of the digital subscriber line receiving end apparatus according to the present invention includes an automatic gain controller (AGC) 40, a timing recoverer 42, an equalizer 44, a slicer 45, an initialization controller 48, and an update controller 49.

Figure 5:
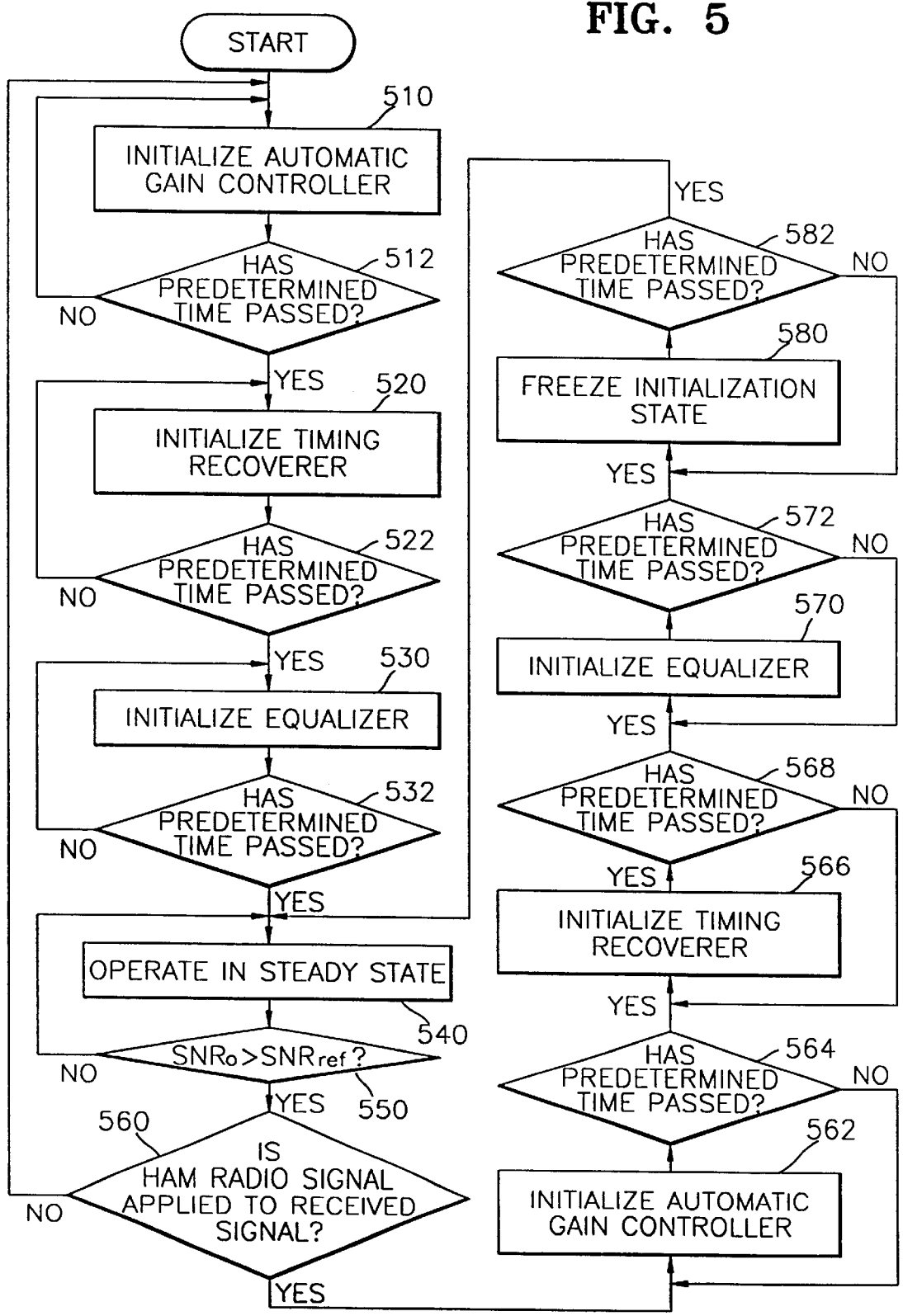
FIG. 5 is a flow chart illustrating a process of safely receiving a signal into which HAM radio interference noise is mixed in a digital subscriber receiving end apparatus according to the present invention.

The initialization controller 48 initializes the automatic gain controller 40, timing recoverer 42, and the equalizer 45. The AGC 40 amplifies a signal received through a communication channel to a predetermined signal size and outputs it. The timing recoverer 42 generates a high quality signal by recovering optimal timing from the signal output by the AGC 40. The equalizer 44 removes interference noise such as intersymbol interference (ISI) and narrowband interference from the high quality signal thereby generating a clean signal. A slicer 45 compares the level of the clean signal to a predetermined level to convert the received signal to a digital signal. The update controller 49 samples the clean signal and freezes the setting of the automatic gain controller 40 and the equalizer 44 when it senses HAM radio interference as described with reference to FIG. 5. This prevents the automatic gain controller 40 and the equalizer 44 from being initialized again when the HAM radio interference signal is detected in the received signal.

The operation of the present invention constructed as mentioned above will be described with reference to FIG. 5.

Figure 1:
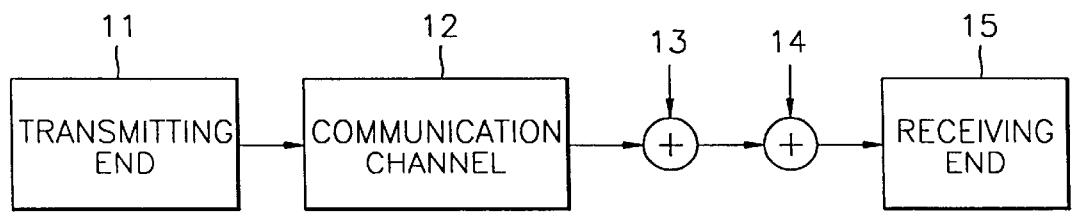
FIG. 1 is a block diagram illustrating the transmission setup of a general digital subscriber line.
Figure 2:
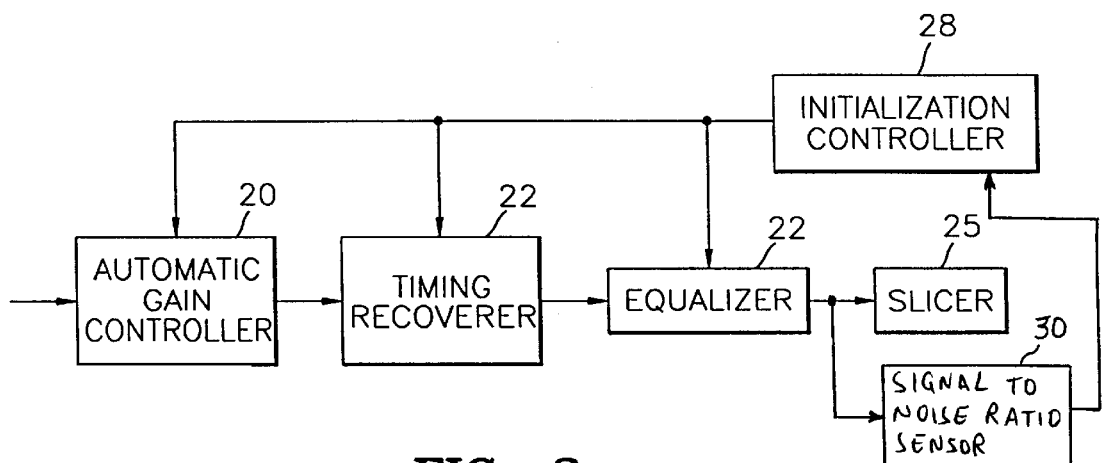
FIG. 2 is a detailed block diagram showing the receiving end of FIG. 1 in detail.

The interference noise 13 and the radio frequency interference signal 14 as described with reference to FIG. 1, are mixed together in a signal applied to the automatic gain controller 40 of the receiving end apparatus 15 through the communication channel.

When the receiving end apparatus is turned on, the automatic gain controller 40 performs initialization in response to the control of the initialization controller 48 (step 510). The initialization of the automatic gain controller 40 is preferably performed for a predetermined length of time, considering the characteristic of the automatic gain controller (step 512).

The timing recoverer 42 for recovering optimal timing in order to select a good quality of signal from the signal output from the automatic gain controller 40 performs initialization in response to the control of the initialization controller 48 (step 520). The initialization of the timing recoverer 42 is preferably performed for a predetermined length of time, considering the characteristic of the timing detector 42 (step 522).

When the initialization of the automatic gain controller 40 and the timing detector 42 is completed, the equalizer 44 is initialized, thus converging a tab coefficient (step 530). The initialization of the equalizer 44 is preferably performed for a predetermined length of time, long enough to converge the tab coefficient (step 532).

When the initialization of the automatic gain controller 40, the timing recoverer 42, and the equalizer 44 is complete, the update controller 49 compares the SNR of the signal output from the equalizer 44 $SNR_o$ to a reference SNR $SNR_{ref}$ to determine if the device is operating in a steady state. Steady state is when $SNR_o$ is less than or equal to $SNR_{ref}$ (step 550).

When the signal to noise ratio $SNR_o$ is less than or equal to the reference signal to noise ratio $SNR_{ref}$, the flow proceeds back to steady state operation (step 540) since the received signal is within the allowed range. However, when it is determined that the signal to noise ratio $SNR_o$ is greater than the reference signal to noise ratio $SNR_{ref}$, it is determined whether HAM radio reference noise is applied to the received signal (step 560). HAM radio interference noise has a periodic on/off characteristic in which the HAM radio signal shows periods of X1 and X2 each of about 10 seconds in which the HAM radio signal is in an 'on' state and periods of Y1 and Y2 each of about 5 seconds in which the HAM radio signal is in an 'off' state as described with reference to FIG. 3. Therefore, three signal changes in which the signal state changes from on to off and from off to on occur in about 15 seconds. Therefore, it is possible for the update controller 49 to confirm HAM radio interference noise by detecting these characteristics.

When the update controller 49 determines that the HAM radio interference noise signal having the on/off characteristic is not applied although there is a change in the received signal, the automatic gain controller 40, the timing recoverer 42, and the equalizer 44 are initialized again according to the change in the received signal. However, when it is determined that the HAM radio interference noise signal having the on/off characteristic is applied, the automatic gain controller 40, the timing recoverer 42, and the equalizer 44 are initialized again according to the received signal included in the HAM radio interference noise. At this time, the automatic gain controller 40, the timing detector 42, and the equalizer 44 are initialized for a time long enough to initialize the same (steps 562 through 572).

In order to prevent the re-initialization of the receiving end apparatus due to the HAM radio interference signal included in the received signal, the update controller 49 freezes the settings of the automatic gain controller 40 and the equalizer 44 so that the automatic gain controller 40 and the equalizer 44 maintain their re-initialized states for a predetermined length of time (steps 580 and 582).

When the predetermined length of time set in step 582 passes, the receiving apparatus operates in the steady state of step 540. The characteristics of the automatic gain controller 40 and the equalizer 44 are updated to a range allowed by the system according to the change in the conditions of the communication channel or the applied noise.

When a noise signal such as the HAM radio interference noise signal with high power is applied and disappears, the signal output by the equalizer 44 of the digital subscriber line receiving end apparatus diverges. Accordingly, the digital subscriber line receiving end apparatus is reset and is initialized. Thus, when the signal output by the equalizer 44 converges, the receiving end apparatus performs steady state operation. Also, since the HAM radio interference noise signal which is the main interference signal has a periodical on/off state characteristic, when the receiving end apparatus senses the HAM radio interference noise, the receiving end apparatus is initialized once so as not to repeat the initialization process of the receiving end apparatus and remains initialized for a predetermined length of time. Namely, since the automatic gain controller 40 and the equalizer 44 are frozen in an initialization state for a certain length of time, the receiving end apparatus is not initialized by the HAM radio interference noise signal and the output of the equalizer 44 is stabilized. Therefore, the receiving apparatus operates stably.

Figure 6:
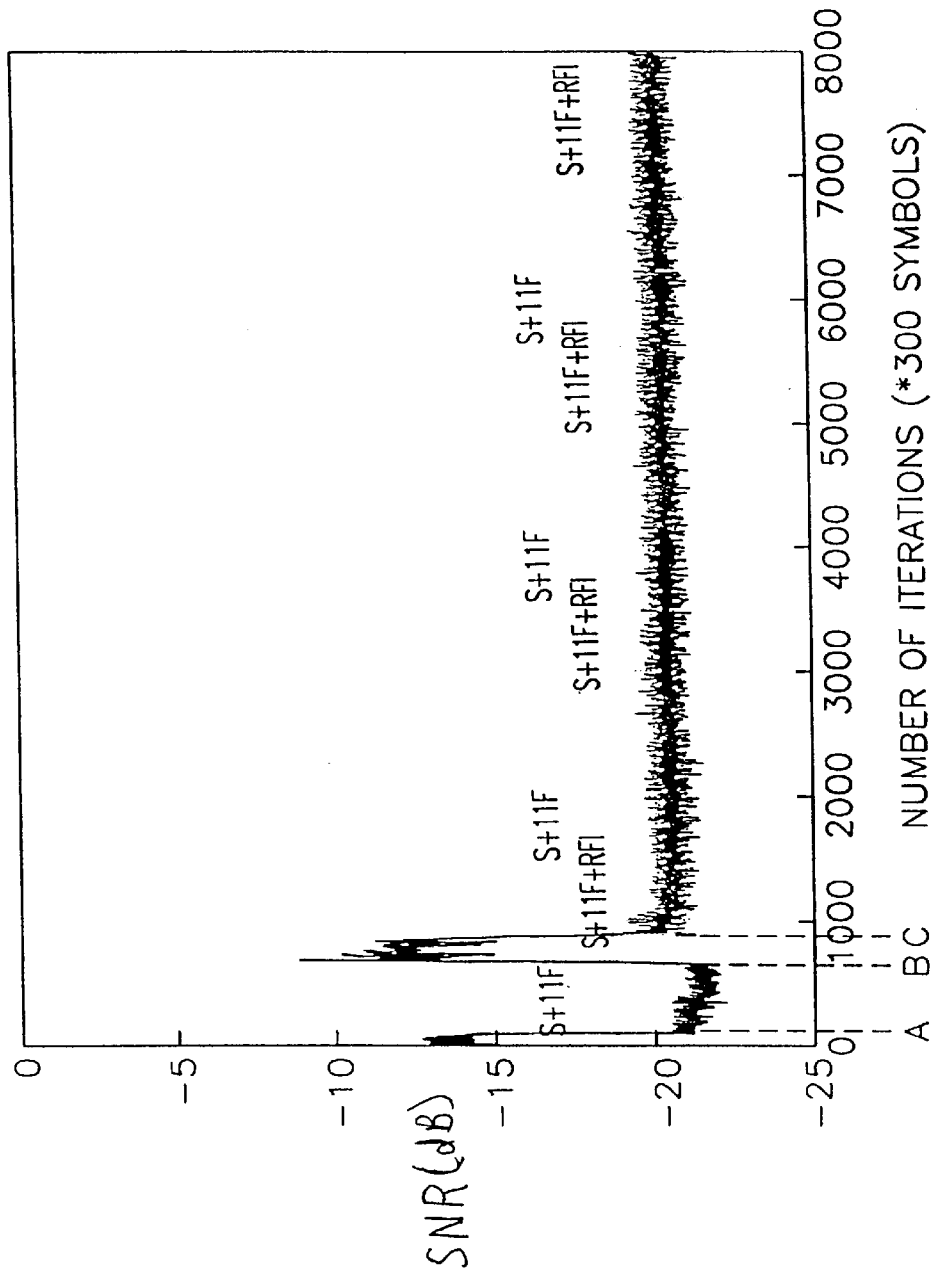
FIG. 6 shows the signal to noise ratio of a signal output from an equalizer of FIG. 4.

FIG. 6 shows a waveform describing a signal to noise ratio of the output signal of the equalizer of FIG. 4. Namely, in FIG. 6, the horizontal axis shows a simulated iteration and the vertical axis shows the signal to noise ratio (SNR) in dB.

Referring to FIG. 6, a digital subscriber line receiving end system is firstly turned on. Then the digital subscriber line receiving end apparatus is initialized according to a signal S and noise 11F (F denotes far end crosstalk) generated by 11 users. Hereinafter, the digital subscriber line receiving apparatus is in the steady state in which the apparatus is initialized in a section between A and B. A signal obtained by adding the HAM radio interference noise signal RFI to the signal S and the noise 11F is applied to a section between B and C.

In the section between B and C in FIG. 6, the digital subscriber line receiving end apparatus is initialized again by a signal comprised of the applied signal S, the noise 11F, and the HAM radio interference noise signal RFI. In order to prevent the receiving apparatus from being frequently initialized by the HAM radio interference noise signal, the automatic gain controller 40 and the equalizer 44 are frozen in their re-initialized state for a predetermined length of time by the update controller 49 so as to maintain the initialization state. Therefore, the receiving apparatus is not initialized for a predetermined length of time by the interference noise S+11F or S+11F+RFI applied in the section after C.

The steady state set around the optimal value in the process of initializing the receiving apparatus in the section between A and B and the section after C changes slightly as shown in FIG. 6 according to the local environment of the digital subscriber line receiving apparatus.

According to the present invention, when HAM radio interference noise is detected in the received signal, the automatic gain controller and the equalizer are frozen to be in their re-initialized state for a predetermined length of time by the update controller. Therefore, the process of initializing the receiving apparatus does not repeatedly occur, and the frequency of initialization of the receiving apparatus is reduced. Accordingly, loss of information due to the initialization of the receiving apparatus is prevented.

Optimal embodiments are provided in the present specification and the drawings. Specific terms used here are not for restricting the meaning or the scope of the present invention provided in the claims but for explaining the present invention. Therefore, anyone skilled in the art will understand that many variations are possible within the scope and spirit of the present invention. Therefore, the real technical protection scope of the present invention should be defined by the spirit of the attached claims.

What is claimed is:

1. A digital subscriber line receiving end apparatus resilient to HAM radio interference noise, for receiving a signal from an information source through a communication channel, comprising:

an automatic gain controller for amplifying a received signal to a predetermined magnitude;

a timing recoverer for recovering timing from a signal output from said automatic gain controller;

an equalizer for removing interference noise from a signal output by said timing recoverer;

an initialization controller for resetting and initializing said automatic gain controller, said timing recoverer, and said equalizer; and an update controller for comparing signal to noise ratio of a signal output by said equalizer to a reference signal to noise ratio, and freezing a re-initialization state of said automatic gain controller and said equalizer for a predetermined length of time when said signal to noise ratio of said signal from said equalizer is greater than said reference signal to noise ratio and HAM radio interference noise is detected in said signal from said equalizer.

2. The apparatus of claim 1, wherein said update controller detects said presence of HAM radio interference noise by sensing frequency of on/off signal characteristics of said equalized signal for a predetermined length of time.

3. The apparatus of claim 1, further comprising:
a slicer for detecting a digital value from said signal from said equalizer.

4. The apparatus of claim 2, further comprising:
a slicer for detecting a digital value from said signal from said equalizer.

5. A digital subscriber line receiving end apparatus resilient to HAM radio interference noise, for receiving a signal from an information source through a communication channel, comprising:

means for amplifying a received signal to a predetermined magnitude;

means for recovering timing from a signal output from said amplifying means;

means for removing interference noise from a signal output by said recovering means;

means for resetting and initializing said amplifying means, said recovering means, and said interference removing means; and means for comparing signal to noise ratio of a signal output by said interference removing means to a reference signal to noise ratio, and freezing a re-initialization state of said amplifying means and said interference removing means for a predetermined length of time when said signal to noise ratio of said signal from said interference removing means is greater than said reference signal to noise ratio and HAM radio interference noise is detected in said signal from said interference removing means.

6. The apparatus of claim 5, wherein said comparing means detects said presence of HAM radio interference noise by sensing frequency of on/off signal characteristics of said signal from said equalizer for a predetermined length of time.

7. The apparatus of claim 5, further comprising:
means for detecting a digital value from said signal from said equalizer.

8. The apparatus of claim 6, further comprising:
means for detecting a digital value from said signal from said equalizer.

9. A method for recovering a signal having HAM radio interference noise in a digital subscriber line receiving apparatus, comprising the steps of:

(a) initializing a automatic gain controller, a timing recoverer, and a equalizer for a predetermined period of time;

(b) determining the existence of HAM radio interference noise by comparing a signal to noise ratio of an output signal from said equalizer to a reference signal to noise ratio;

(c) continuing said step (b) after initializing said automatic gain controller, said timing recoverer, and said equalizer again when HAM radio interference noise is not detected in said step (b); and (d) continuing said step (b) after initializing said automatic gain controller, said timing recoverer, and said equalizer again and freezing said automatic gain controller and said equalizer for a predetermined time, when said HAM radio interference noise is detected in said step (b).

10. The method of claim 9, wherein the presence of HAM radio interference noise is detected by sensing frequency of on/off signal characteristics of said equalizer signal output for a predetermined length of time.

* * * * *